May 3, 1932. E. C. HATCHER 1,857,020
POWER TRANSMISSION GEARING
Filed Aug. 20, 1930 3 Sheets-Sheet 1
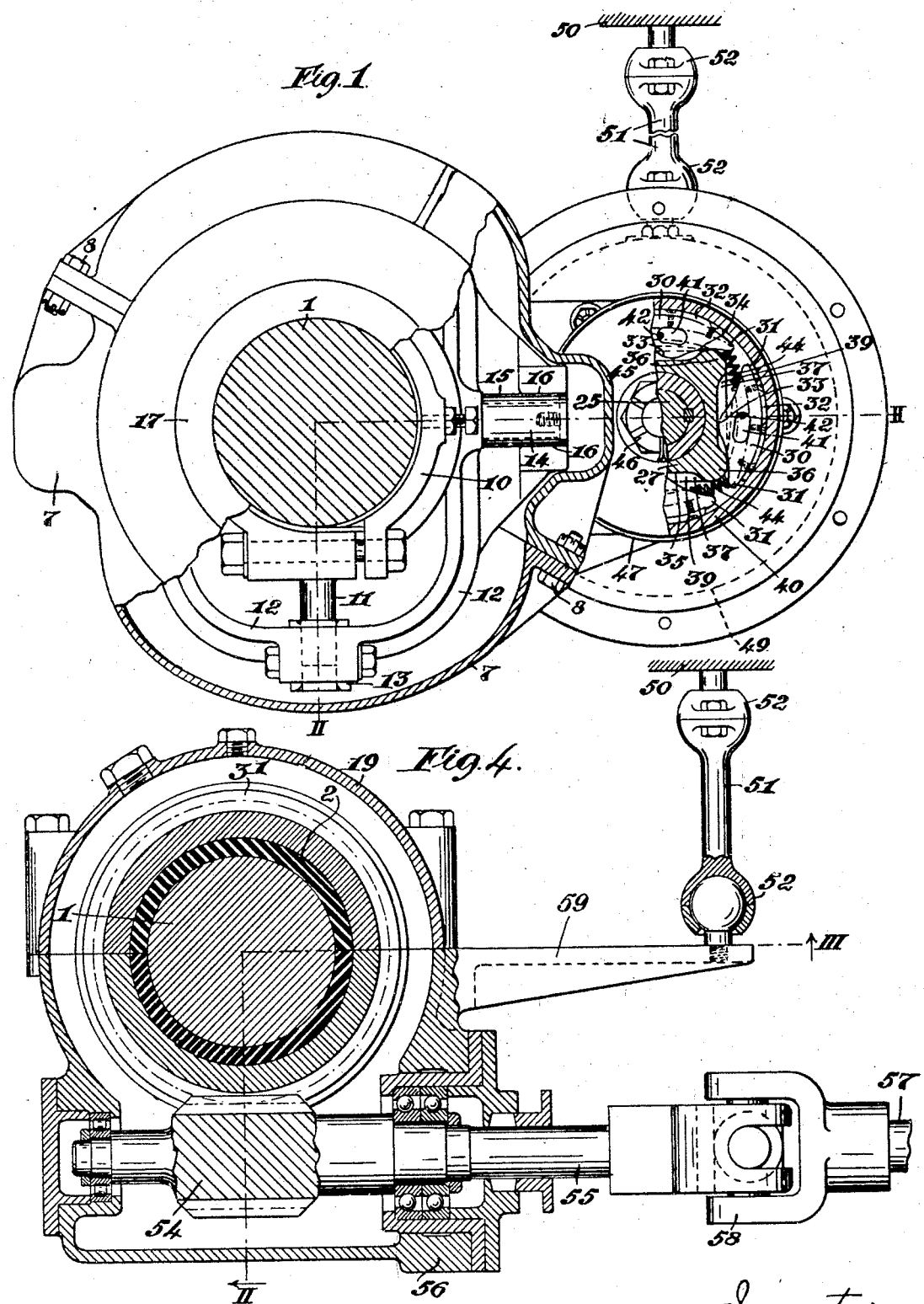
Inventor,
Ernest C. Hatcher,
By Henry Orth Jr.
Atty.

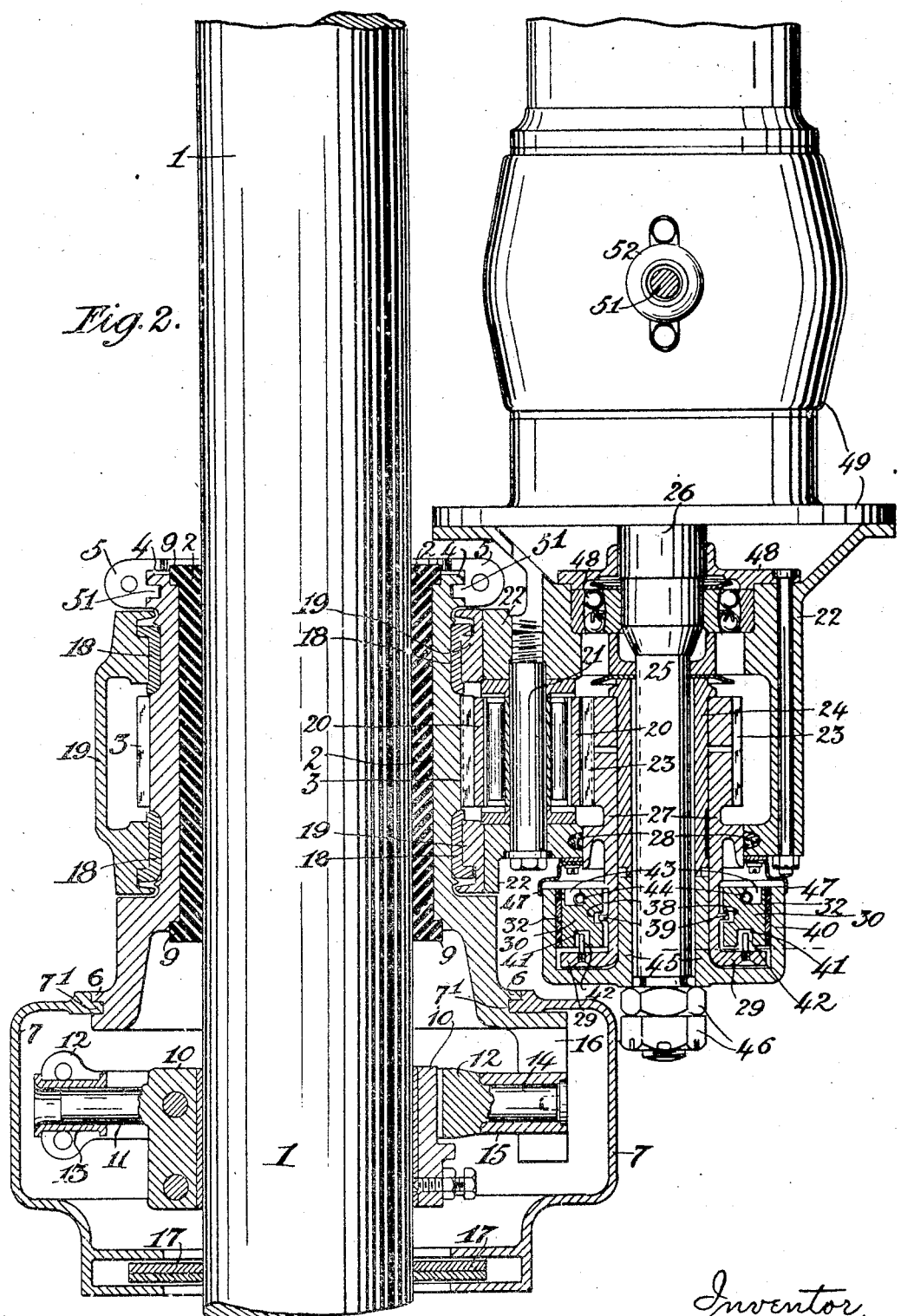

May 3, 1932. E. C. HATCHER 1,857,020
POWER TRANSMISSION GEARING
Filed Aug. 20, 1930   3 Sheets-Sheet 3
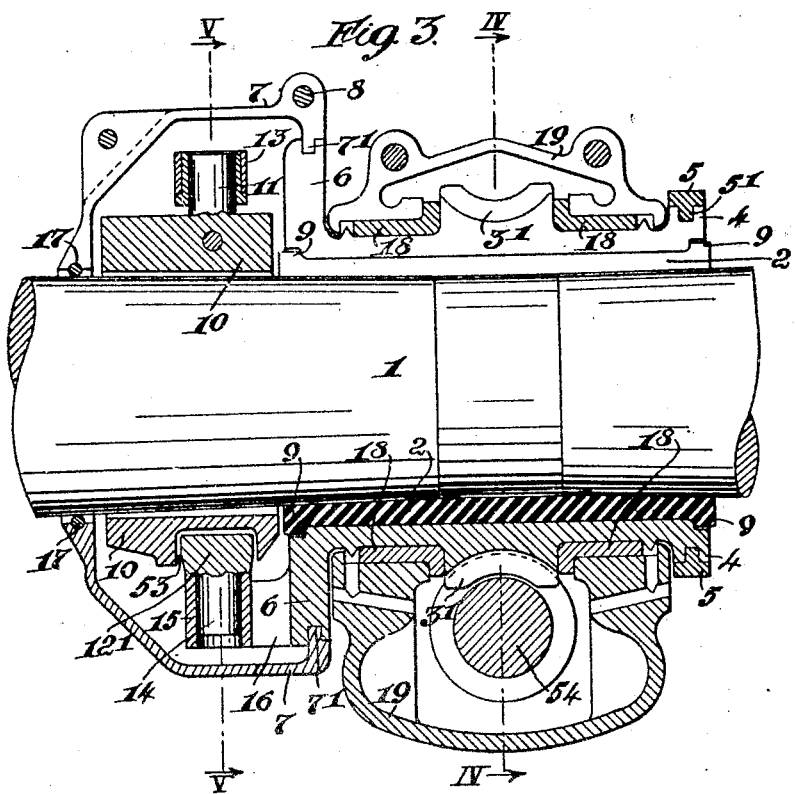
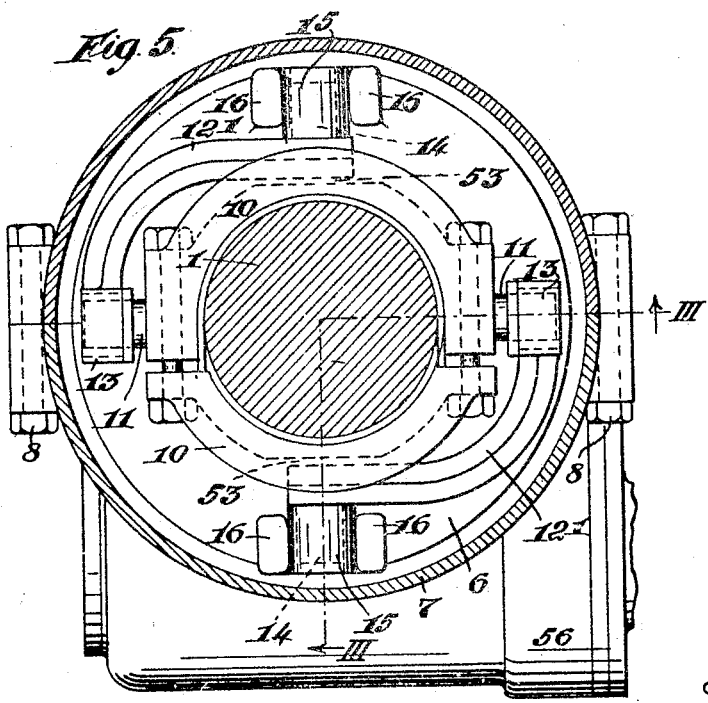
Inventor
Ernest C. Hatcher,
By Henry Ortt Jr.
Atty.

Patented May 3, 1932, 1,857,020

UNITED STATES PATENT OFFICE

ERNEST CHARLES HATCHER, OF NORTHWOOD, ENGLAND, ASSIGNOR TO J. STONE & COMPANY LIMITED, OF DEPTFORD, ENGLAND, A COMPANY OF ENGLAND

POWER TRANSMISSION GEARING

Application filed August 20, 1930, Serial No. 476,587, and in Great Britain September 9, 1929.

This invention comprises improvements in and connected with power transmission gearing, for instance for the running axles of vehicles and particularly the axles of railway vehicles. In the specification of Patent No. 1,772,748 I have described and claimed transmission gearing for driving dynamos and other apparatus from running axles of vehicles comprising in combination a positive gearing such as toothed or chain gearing and a centrifugal clutch, the centrifugal members of the clutch being adapted for releasing the driven spindle when the axle speed falls. One object of the present improvements is to obtain a driving grip in the clutch which is greater and prompter in action than that obtained when the centrifugal members are radially in guides and effect a driving grip mainly by centrifugal action.

According to the present improvements, in a centrifugal clutch device the centrifugal clutch members are so adapted that they undergo a camming or wedging action by the driving member when they grip the driven member, so that the centrifugal action is operative mainly for initiating the grip and the mechanical camming or wedging action is operative for binding the centrifugal members tightly against the driven member for transmission of the drive.

According to a further feature of this invention the driving gear wheel is elastically mounted upon the vehicle axle with the aid of an interposed rubber or like resilient sleeve. With this arrangement not only the driving gear wheel but also associated parts and their casings, for example the universal coupling, transmission gear and clutch device, may be supported solely by the resilient sleeve. A torque member is provided to prevent the mechanism rotating around the axle, said member being adapted not to interfere with the action of the universal coupling.

As there is no annular air clearance between the interior of the hub of the gear wheel and the axle, this arrangement obviates the large clearance which sometimes had to be provided in the case of rolling stock required to travel over rough roads or tracks lest the gear wheel should strike the axle and be damaged by the impact. It is desirable moveover to keep the diameter of the driving gear wheel as small as possible in view of the necessary clearance between said wheel and the track. With the present arrangement the annular space can be reduced to a minimum and the gear wheel may consequently be of a minimum diameter, for the interposition of the resilient body makes it physically impossible for the wheel to make impact with the axle, no matter how rough the road may be.

The driving gear wheel is generally made in two parts adapted for being bolted together around the axle so that the gear wheel can be applied around the axle of an existing coach. In order to accommodate the bolts, the gear wheel must be made of a larger diameter than it need be if such bolts were absent. As stated it is desirable to use gear wheels as small as possible so as to leave as much clearance as possible between them and the roadway or track. According to a further feature of these improvements, the parts of a gear wheel of the kind in question are fastened together around the axle by clamping means encircling such parts.

Two embodiments of the invention are illustrated by way of example in the accompanying drawings, in which:—

Fig. 1 is a side elevation, partly in section, of one form of drive.

Fig. 2 is a section on the line II—II of Fig. 1.

Fig. 3 is a section of a different form of drive, taken on the line III—III of Figs. 4 and 5, Fig. 4 is a cross section on the line IV—IV of Fig. 3, and Fig. 5 is a cross section on the line V—V of Fig. 3.

Figs. 1 and 2 illustrate a form of drive similar to that illustrated in Figs. 4, 5 and 6 of the above mentioned patent specification. The vehicle axle 1, which may be a rough axle, carries a rubber sleeve 2 upon which, in turn, a pinion 3 is mounted. Both the rubber sleeve 2 and the pinion 3 are split lengthwise into two parts which are clamped together in the following manner: The hub portions of the two halves of the pinion 3 are extended on either side of the toothed portion thereof, one side of the extended hub being formed with a grooved annular enlargement 4. For gripping together the two halves of this end of the hub the two halves 5 of a radially split clamping ring are bolted together over the grooved enlargement 4. On the other side the hub extension has a grooved enlargement 6 of greater diameter than that of 4. A radially split casing 7, the halves of which are bolted together by bolts 8, is utilized to clamp the hub halves together at this end. By these means the two halves of the pinion 3 are securely clamped together around the split sleeve 2; relative lengthwise movement between the pinion 3 and sleeve 2, is prevented by shoulders 9 on the latter and relative such movement between the parts of the pinion 3 and between the pinion 3 and the clamping means 5, 7 is prevented by ribs 5', 7' on said means engaging the grooves in the enlargements 4, 6. Owing to the absence of bolts within the periphery of the pinion 3 for bolting the parts thereof together, the pinion may have a diameter which is very little larger than that of the hub.

A drive is transmitted from the axle 1 to the pinion 3 not through the rubber sleeve 2 but through a universal coupling of the kind shown in Figs. 4 and 5 of patent specification hereinbefore referred to. As the action of such couplings is fully described in that specification, it may be briefly stated that the coupling comprises a split driving ring 10 clamped on the axle 1, outwardly directed pins 11 mounted or formed on said ring at diametrically opposite points an oblong gimbal ring 12 provided at diametrically opposite ends with eyelets 13 in which the pins 11 are radially slidable, outwardly directed pins 14 mounted or formed on the flat sides of the gimbal ring 12 and provided with friction reducing rotatable sleeves 15, and forked arms 16 on the hub enlargement 6 between which the pins 14 can move radially and axially of the axle 1. The coupling is encased by the housing 7 which has a dust tight closure 17 at the outer end.

The hub extensions of the pinion 3 are journalled in bushings 18 of bearing metal in a non-rotatable casing 19. Said pinion meshes with a pinion 20 rotatable about a shaft 21 mounted in a further casing 22 to which the casing 19 is bolted. The pinion 20 meshes in turn with a pinion 23 which is freely rotatable about a sleeve 24 keyed to a reduced extension 25 of a dynamo shaft 26. The hub of the pinion 23 is extended in the direction away from the armature shaft 26, the extension 27 having a journal bearing at 28 in the casing 22.

On the far side of this bearing 28 the hub-extension 27 is provided with a terminal flange 29 between which and said bearing the expansible elements 30 of a centrifugal clutch are disposed. These elements, four in number, take the form of shallow segmental shoes with tapered ends 31, the outer cylindrical surfaces of the shoes being fitted with pads 32 of friction material. The inner surface of each shoe 30 comprises a central hump 33 merging at each of the tapered ends into a concave surface 34. The driving member consists of a substantially square formation 35 on the hub extension 27, a protruding circular elevation 36 being provided at each corner of the square. The four elevations 36 are thus separated by four shallow recesses 37 for the reception of the convex humps 33 of the four shoes 30. Each of the humps 33 is longitudinally grooved at 38 for engagement with a rib 39 formed on the driving part 35 in the respective shallow recess 37, this engagement serving to keep the shoes 30 to their track within the clutch drum 40. Each of the shoes 30 has a recess 41 on the side nearer the flange 29 and each recess 41 is engaged by a shoe-positioning pin 42 extending laterally thereinto from said flange. The pins 42 have ample clearance in the recesses 41 so as to permit not only of outward and inward movements of the shoes 30 but also of limited rocking or circular movements thereof. On the opposite sides the shoes 30 have arcuate grooves 43 for receiving an arc of a coil-spring ring 44 which tends always to contract the shoes around the driving part 35. The clutch drum 40 is integral with a sleeve 45 keyed to the shaft 25 and secured thereon by nuts 46. As may be seen from Fig. 2 the various clutch parts are housed within said drum 40 the open end of which is closed, apart from a slight clearance, by a cover 47 secured to the casing 22. The casing 22 supports a ball bearing 48 for the dynamo shaft 26 and is rigidly bolted to the casing 49 of the dynamo. As illustrated more clearly in Fig. 1 the dynamo is suspended from the vehicle frame 50 by a link 51 both ends of which are fitted with joints 52 providing a limited degree of universal motion.

The operation of a drive of this nature is as follows:—Rotation of the vehicle axle 1 is transmitted from the ring 10 through the coupling 11—16 to the gear wheel 3, whence a drive is transmitted through the gear wheels 20, 23 to the hub extension 27. Assume that the axle 1 is accelerating after being at rest: The centrifugal force on the shoes 30 is insufficient to throw them out against the resistance of the spring 44 and consequently the hub extension 27, the driving part 35 and flange 29 thereon, and the shoes 30 rotate idly together. When the axle speed is such that the shoes 30 come into frictional contact with the stationary drum 40, said shoes immediately suffer a retardation in relation to the driving part 35 the elevations 36 on which engage against one or other of the concave cam surfaces 33 on each of the shoes 30 and, owing to the cam effect, press the latter forcibly against the interior of the clutch-drum, producing a strong reliable clutching action. A drive is thus transmitted to the armature shaft 26 through the sleeve 45. On the axle speed falling below the cut-out speed of the clutch, the driven apparatus with the drum 40 will tend to over-run the axle and the driving member 35. The friction between the drum and shoes 30 will release the latter from the driving member 35 leaving said shoes free to be contracted by the spring 44.

In contradistinction to the arrangement described in the above mentioned prior specification neither of the casings 19 or 22 is mounted on the vehicle frame. Instead the gear wheel 3 is mounted on the axle 1 by means of the rubber sleeve 2 and the casings 19, 22 are supported partly by the axle through the gear wheel 3 and partly by the dynamo suspension 50—52 which is designed to take up the torque exerted on said casings without restricting the freedom permitted to the gearing, in relation to the axle, by the coupling means 10—16. The sleeve 2 prevents the possibility of even a violent shock causing contact between the axle and gear wheel 3.

As a precaution against the complete destruction of the centrifugal clutch, and possibly of other parts of the apparatus, the clutch shoes 30 may be made in two parts, an outer part carrying the friction pad 32 and an inner part upon which the elevation 33 is formed. These two parts may then be connected by means of a member made of a readily fusible metal. With this arrangement evolution of heat resultant upon abnormal conditions in the drive, for example undue slip in the clutch, will melt the fusible members and disconnect the two parts of the clutch shoes, thereby restricting the damage to the said shoes.

Figs. 3, 4 and 5 illustrate the application of the features of this invention to a type of drive employing a worm and worm wheel in place of the pinion transmission of Figs. 1 and 2. The split worm wheel 3' is clamped, similarly to the pinion 3, over a rubber sleeve 2 on the axle 1 by means of the split clamping ring 5 and split casing 7. The universal coupling whereby axle rotation is communicated to the wheel 3' is of a modified construction, the gimbal ring being effectively replaced by a pair of arms 12' which extend around the shaft about diametrically opposite arcs of 90° and are each provided at one end with an eyelet 13 slidable radially on a pin 11 on the clamping ring 10 and at the other end with a pin 14, 15 movable, both radially and axially of the axle 1, in a fork 16 on the hub extension 6 of the worm wheel 3'. The latter ends of the arms 12' are guided tangentially of the clamping ring 10 in grooves 53 in the said ring. Such a coupling acts in precisely the same manner as the couplings referred to above. Similar results can be achieved by mounting the eyelets 13 at the ends of a yoke having two arms which extend around adjacent arcs of 90° a single pin 14, which engages a single fork 16 on the hub extension 6, being mounted at the mid-point of said yoke.

The worm wheel 3' drives a quick pitch worm 54 on a shaft 55 at right angles to the axle 1. This shaft is journalled in a casing 56 attached to the casing 19 around the gear wheel 3' and is connected to a transmission shaft 57 extending longitudinally of the vehicle by a universal joint 58. The shaft 57 is connected by a second universal joint (not shown) to a shaft section carrying the expansible elements of a centrifugal clutch device through which the dynamo or other piece of apparatus is driven. This clutch device may be of the type described above with reference to Figs. 1 and 2.

As in the gear of Figs. 1 and 2, the casing 19 is not supported directly from the vehicle frame but from the axle 1 through the rubber sleeve 2, the wheel 3' and bearing 18. Torque in the casing 19 is taken up by an arm 59 connected by a link 51 and universal joints 52 to the vehicle frame 50.

I claim:—

1. Transmission gearing comprising an automatic clutch device consisting of a driving part, a driven part external to said driving part, shallow segmental shoes operatively associated with the driving part and centrifugally expansible into clutching engagement with the driven part, cam-like elevations on the inner sides of said shoes, and complementary cam means located on the driving part and operative upon said elevations for augmenting the centrifugal clutching effect.

2. Transmission gearing for use in conjunction with an axle of a railway vehicle, comprising in combination, a centrifugal clutch, a divided gear-wheel, a universal coupling connecting said gear-wheel and said axle and located laterally, a mounting for said gear-wheel consisting of a resilient sleeve embracing the axle, and annular clamping means encircling the gear-wheel for clamping together the parts thereof over said resilient sleeve.

3. Mechanism for transmitting power from a running axle to a driven apparatus comprising in combination, meshed wheel gearing including an annular driving gear surrounding the axle and a gear loose on the spindle of the driven apparatus, a resilient sleeve mounting between said axle and annular gear, a universal coupling between the axle and said annular gear, a hub revoluble with the said loose gear, a drum fixedly mounted on the spindle of the apparatus, centrifugal shoes guided on said hub and adapted for flying out into gripping engagement with said drum when the loose gear revolves with appropriate speed, and cam means on said hub adapted for engaging said shoes to augment the centrifugal gripping action.

4. Transmission gearing for use in conjunction with an axle of a railway vehicle comprising in combination, a driving gear-wheel, a universal coupling connecting said axle and gear-wheel and located laterally of said gear-wheel, and a mounting for said gear-wheel consisting of a resilient sleeve disposed between it and the axle, the transmission gearing being supported, at least in part, from the axle by the resilient sleeve.

5. Transmission gearing for use in conjunction with an axle of a railway vehicle, comprising in combination, a divided gear-wheel, a universal coupling connecting said gear-wheel and said axle and located laterally of the former, a mounting for said gear-wheel consisting of a resilient sleeve embracing the axle, and annular clamping means encircling the gear-wheel for clamping together the parts thereof over said resilient sleeve.

ERNEST CHARLES HATCHER.